United States Patent [19]
Beelitz

[11] Patent Number: 6,041,395
[45] Date of Patent: Mar. 21, 2000

[54] SYSTEM AND METHOD FOR CHANGING PARTITION MAPPINGS TO LOGICAL DRIVES IN A COMPUTER MEMORY

[75] Inventor: Alan E. Beelitz, Austin, Tex.

[73] Assignee: Dell USA, L.P., Round Rock, Tex.

[21] Appl. No.: 08/984,386

[22] Filed: Dec. 3, 1997

[51] Int. Cl.[7] .................................................. G06F 12/00
[52] U.S. Cl. .......................................... 711/173; 713/100
[58] Field of Search ................................... 711/170, 173; 713/1, 100

[56] References Cited

U.S. PATENT DOCUMENTS

| 5,675,769 | 10/1997 | Ruff et al. ............................ 395/497.04 |
| 5,706,472 | 1/1998 | Ruff et al. ............................ 395/497.04 |
| 5,974,517 | 10/1999 | Gaudet .................................... 711/173 |

OTHER PUBLICATIONS

PartitionMagic 3.0 User Guide, manual version 8, copyright 1994–1997, pp. 79–80.

Randall, Neil, "Partitioning Your Hard Disks: What You Need to Know Before You Start", PC Magazine, vol. 16, No. 11, Jun. 10, 1997, pp. 243–245, and also IAC Accession No. 19437805.

U.S. Serial No. 08/950,545, filed on Oct. 15, 1997, System and Method for Updating Partition Mappings to Logical Drives in a Computer Memory Device, Alan E. Beelitz, Abstract and 1 sheet of drawings.

U.S. Serial No. 08/947,138, filed on Oct. 8, 1997, Method for Simulating a Computer Storage Device, Alan E. Beelitz, Abstract and 1 sheet of drawings.

Publication entitled "Partition Magic 2.01 for OS/2, Windows 95, Windows & DOS", dated Aug. 11, 1997, Pete Cassetta, 3 pages.

*Primary Examiner*—Eddie P. Chan
*Assistant Examiner*—Kevin Verbrugge
*Attorney, Agent, or Firm*—Haynes & Boone, L.L.P.

[57] ABSTRACT

A system and method for changing partition mappings to logical drives in a memory device of a computer. The computer includes a processor for running operating system code and a hard drive. The hard drive, which can be accessed by the processor, includes at least two partitions, the first partition initially being active and having a type that is recognized by the operating system and the second partition initially being inactive and having a type that is not recognized by the operating system. When the computer boots up, a logical reference value in the operating system code points to the first partition. A reference-changing routine is then run for dynamically switching the logical reference value to the second partition. This is achieved by having the reference-changing routine change certain tables in the operating code. The tables are used by the operating system code to logically map the logical reference to a particular partition. Therefore, after the reference-changing routine directs the logical reference to point to the second partition, the processor may continue running the operating code without requiring the computer to reboot.

12 Claims, 2 Drawing Sheets

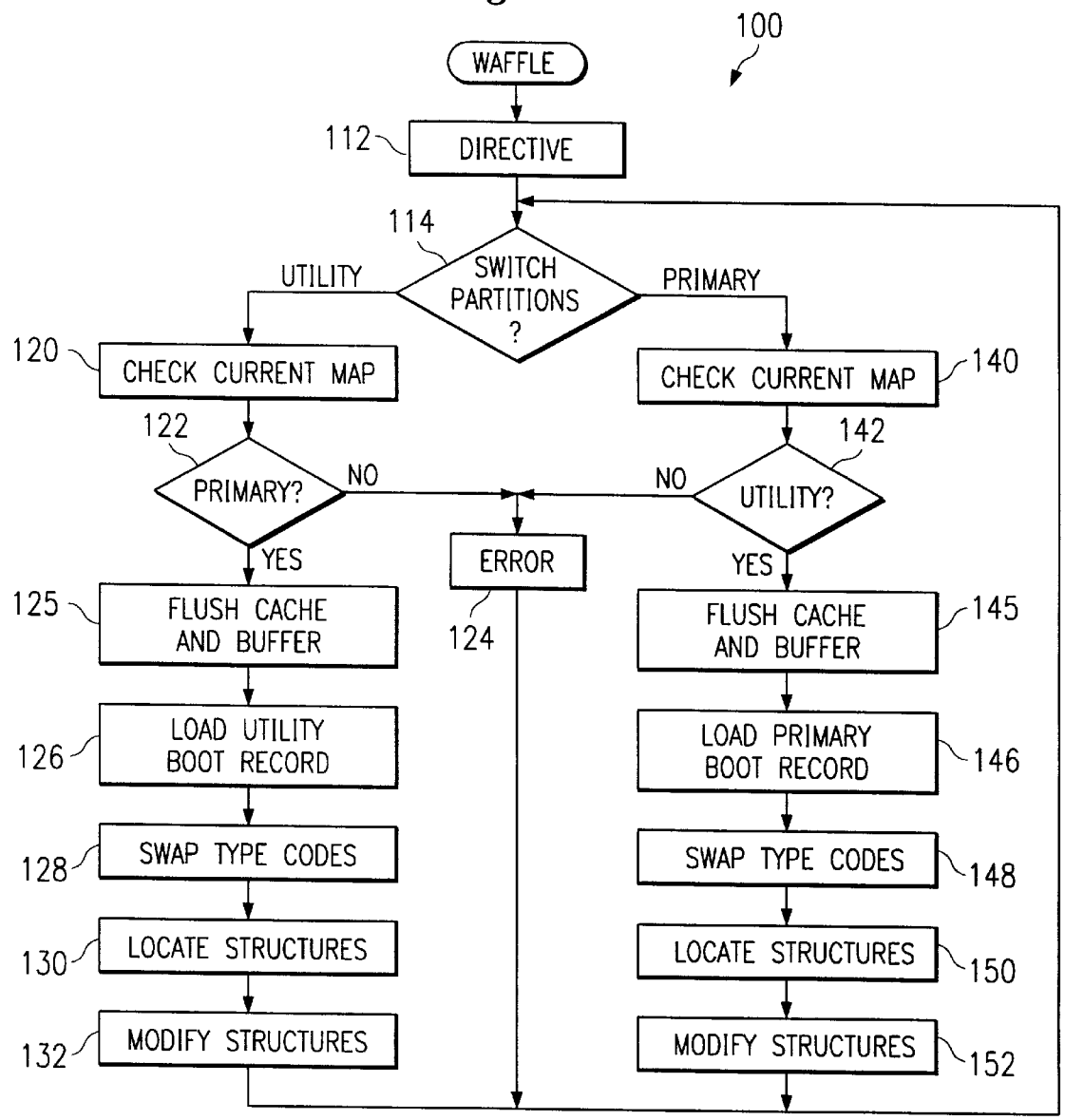

6,041,395

SYSTEM AND METHOD FOR CHANGING PARTITION MAPPINGS TO LOGICAL DRIVES IN A COMPUTER MEMORY

BACKGROUND

The present disclosure relates generally to computers and operating system code for controlling access to a computer disk, and, more specifically, to a method for dynamically changing the mapping of partitions of the disk to a logical drive of the operating system code.

In a computer having one or more storage devices such as a hard disk, the storage devices are often separated into different partitions so that certain data or programs can be separately stored. For example, in a computer that utilizes a Microsoft DOS or WINDOWS operating system, as provided by Microsoft Corporation of Redmond, Wash., a single computer hard drive may be partitioned into a primary partition which would contain the DOS or WINDOWS operating system along with other application programs, and a utility partition which would contain utility or maintenance type programs.

In some cases, it is not desirable to allow a user to access the utility partition during normal operation of the computer because the user could easily loose or destroy data on his hard drive, reconfigure the computer, or engage in other scenarios best kept from the user. Therefore, a solution is to configure the utility partition so that it is "invisible" by the operating system and hence inaccessible by the user. This is accomplished by setting a partition type code for the utility partition to a value that is not recognizable by, or invalid to, the operating system and setting an activity flag as "inactive." However, the primary partition remains "visible," having a partition type code that is recognizable, or valid to, the operating system and an activity flag set as "active."

Although the utility partition is invisible to the user, the above scenario has several problems associated therewith. One problem occurs in the manufacturing process when software is downloaded to the hard drive. In situations such as this, it is desired to alternate between the utility and primary partitions. However, an operating system of the computer only refers to visible partitions as logical drives, assigning or "mapping" to them a drive letter for reference. Using the DOS operating system for example, the primary partition is an active partition on the hard drive and is assigned a "C:" drive letter. Meanwhile, the utility partition is inactive and does not have an assigned drive letter. Another problem with the above scenario is that many software download processes include a single logical reference for a hard drive, such as a "C:" drive in the DOS example, and are therefore not able to distinguish between the two partitions. This is because, as mentioned above, only one of the partitions has an associated drive letter.

The typical solution to the above problems is to change the partition type code for the desired partition to "active", and reboot the computer. However, such reboots are expensive in that they take a large amount of time and resources. Furthermore, reboots tend to loose or reconfigure certain aspects of the computer that the user may want to retain. For example, if a program stored in the primary partition causes the computer to fail in a certain condition, it may be desirable to use a maintenance program in the utility partition to diagnose the computer. However, to access the maintenance program, the computer must be rebooted, thereby losing the ability to diagnose the state of the computer at failure.

SUMMARY

In response thereto, provided is a system and method for changing partition mappings to logical drives in a memory device of a computer. In one embodiment, the computer includes a processor for running operating system code and a hard drive memory device. The hard drive, which can be accessed by the processor, includes at least two partitions, the first partition initially being active and having a type that is recognized by the operating system and the second partition initially being inactive and having a type that is not recognized by the operating system.

When the computer boots up, a logical reference value in the operating system code points to the first partition. A reference-changing routine is then run for dynamically switching the logical reference value to the second partition. This is achieved by having the reference-changing routine change certain predefined tables in the operating code. The tables are used by the operating system code to logically map the logical reference to a particular partition. Therefore, after the reference-changing routine directs the logical reference to the second partition, the processor may continue running the operating code without requiring the computer to reboot.

A technical advantage achieved is that both partitions of the storage device can be accessed without requiring reboots in between, thereby saving a substantial amount of time.

Another technical advantage achieved is that programs or routines in one partition can be used to configure the computer, and then programs or routines in the other partition can be used to perform maintenance or other utility operations on the configured computer.

BRIEF DESCRIPTION OF THE DRAWINGS

FIG. 3 is a flow chart of a routine to be run by the computer of FIG. 1.

DETAILED DESCRIPTION OF THE PREFERRED EMBODIMENT

The following disclosure incorporates by reference U.S. patent application Ser. No. 08/950,545, entitled "Method for Updating Partition Mappings to Logical Drives in a Computer Memory Device" and U.S. patent application Ser. No. 08/947,138, entitled "Method for Simulating a Computer Storage Device", filed concurrently herewith.

Figure 1:
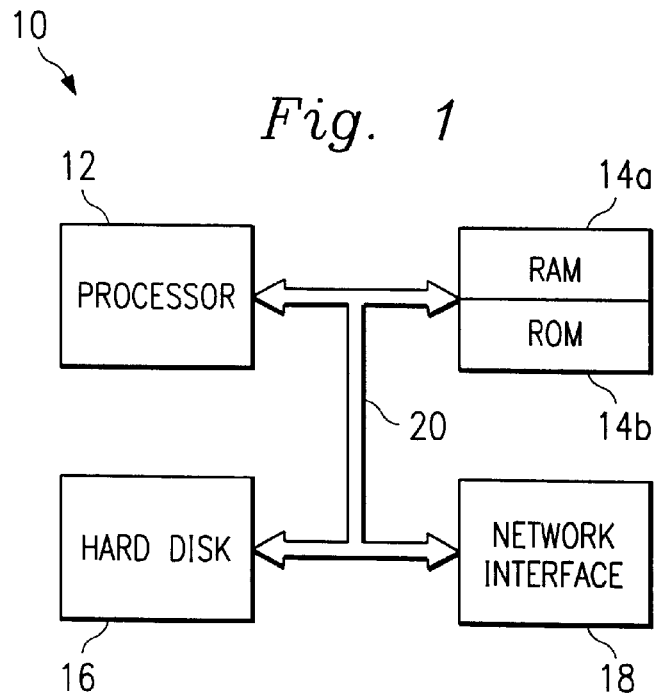
FIG. 1 is a block diagram of a computer for implementing one embodiment.

Referring to FIG. 1, the reference numeral 10 designates a computer having several components, including a processor 12, a bank of random access memories (RAM) 14a and read only memories (ROM) 14b, a hard disk 16, and a network interface 18. Each component is capable of communication with the processor 12, as graphically represented by a general bus 20. In the present example, the computer 10 is a personal computer running Microsoft DOS and/or WINDOWS. It is understood, however, that the computer 10 and its illustrated components are merely representative of many different types of computers and components well known and understood by those of ordinary skill in the art.

Figure 2:
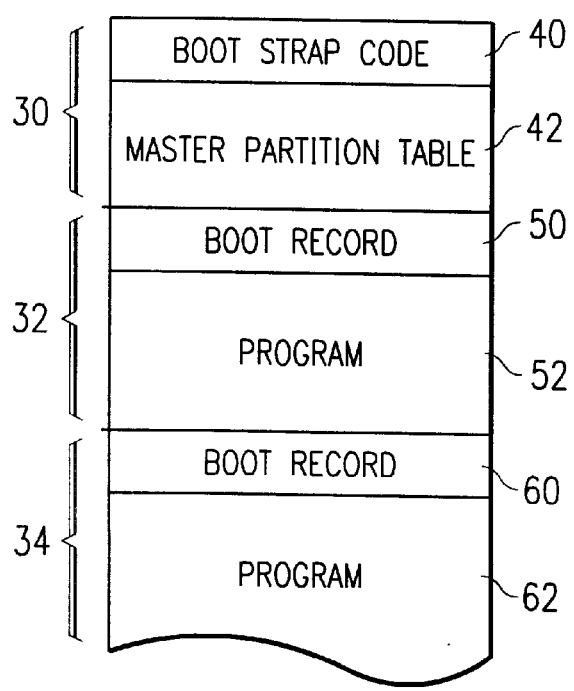
FIG. 2 is a layout diagram of a hard drive of the computer of FIG. 1.

Referring to FIG. 2, the hard disk 16 is subdivided into three different partitions: a master boot record 30, a utility partition 32, and a primary partition 34. Located in the master boot record 30 is boot strap code 40 and a master partition table 42. The master partition table includes code that represent a type for each partition 32 and 34. It is understood that the master boot record 30 also contains conventional code, such as for booting up the computer 10, which is well known in the art.

The utility partition 32 includes a boot record 50 and one or more pieces of software, such as a maintenance program 52. In normal operation, the utility partition 32 will only be used during special circumstances, such as during maintenance and computer diagnostics operations. The primary partition 34 also contains a boot record 60 and one or more pieces of software, such as a program 62. In normal operation, the primary partition 34 will often be used and will consume the largest portion of the hard drive 16. Therefore, during normal operation, when an operating system accesses the hard drive 16, it will only see and access the primary partition 34 and not the utility partition 32.

Tables 1 and 2 below illustrate sample entries in the master partition table 42. Table 1 describes a portion of the master partition table 42 when the primary partition 34 is visible by DOS and the utility partition 32 is invisible to DOS. Table 2 describes a portion of the master partition table 42 when the utility partition 32 is visible by DOS and the primary partition 34 is invisible to DOS.

TABLE 1

| Entry | Code | Value |
|---|---|---|
| 1 | type | DEh |
|   | flag | inactive |
|   | location/size | utility partition 32 |
| 2 | type | 06h |
|   | flag | active |
|   | location/size | primary partition 34 |
| 3 | type | none |
|   | flag | — |
|   | location/size | — |
| 4 | type | none |
|   | flag | — |
|   | location/size | — |

TABLE 2

| Entry | Code | Value |
|---|---|---|
| 1 | type | 06h |
|   | flag | active |
|   | location/size | utility partition 32 |
| 2 | type | DEh |
|   | flag | inactive |
|   | location/size | primary partition 34 |
| 3 | type | none |
|   | flag | — |
|   | location/size | — |
| 4 | type | none |
|   | flag | — |
|   | location/size | — |

Referring to FIG. 3, a routine 100 entitled "Waffle" allows the operating system to switch back and forth between the two partitions 32, 34. For the sake of example, the utility partition 32 is initially inactive and the primary partition 34 is active. Also, the partition type code for the utility partition 32 is set equal to an invalid type and the partition type code for the primary partition 34 is set equal to a valid type. In continuance of the above example, the operating system is DOS, the type 06h is a valid partition type code, the type DEh is an invalid partition type code, and the primary partition has an assigned C: drive letter. Therefore, DOS initially recognizes, or "sees", the primary partition 34 but not the utility partition 32. Also, certain tables for referencing the layout and organizational mappings for each of the active drives, including a logical C: drive, are used by DOS to map the logical C: drive to the primary partition 34. Therefore, all read and write operations to the C: drive are made to the primary partition 34. It is understood that the above described reference codes and drive letters are defined by DOS, or which ever operating system is being used, and are well understood by those of ordinary skill in the art.

Waffle is initiated by the processor 12 loading it into RAM 14a. Waffle is a logical-reference-changing routine and, in the present embodiment, is downloaded from a network connected through the network interface 18. In addition, the network includes some operating system code so that the computer 10 may at this step reboot from the network, i.e., the computer reboots using the operating system code retrieved from the network interface 18. Alternatively, the processor 12 may load Waffle from either or both of the partitions 32 and 34, from a floppy disk (not shown) or other source.

At step 112, a directive is received indicating a particular partition to access. In the present embodiment, the directive is provided by a manufacturing process attempting to download software on either or both partitions 32, 34. A directive "utility" indicates a desire to access the utility partition 32, while a directive "primary" indicates a desire to access the primary partition 34. The directives may be input from a user interface (not shown), the network interface 18, or some other input device. Furthermore, it is anticipated that additional partitions may also be available, but only two partitions will be herein discussed for the sake of simplicity.

At step 114, a determination is made as to whether or not the user wants to switch partitions. If the received directive is "utility", then at step 120, Waffle checks the DOS reference tables to ensure that the logical C: drive currently maps to the primary partition 34. At step 122, if the logical C: drive does not map to the primary partition 34, then execution proceeds to step 124 where an error message is displayed, stating that the utility partition is already active. Once displayed, execution returns to step 114. If, however, the logical C: drive does map to the primary partition 34, execution proceeds to step 125.

At step 125, Waffle flushes any buffers used by the operating system (e.g., a DOS buffer) and if the computer 10 includes a cache, Waffle flushes the cache so that no inconsistencies will thereby exist. At step 126, Waffle loads into RAM 14a the partition boot record 50 for the utility partition 32. At step 128, Waffle swaps the type codes and activity flags for both partitions 32, 34. In the present example, the utility partition 32 will now have a type code equal to 06h and have an activity flag designated active, and the primary partition 34 will now have a type code equal to DEh and have an activity flag designated inactive. In this way, the master partition table 42 is consistent with the new mapping, and if the computer 10 is rebooted, it will return to the above described state in which the utility partition 32 is the active and visible partition.

At step 130, Waffle locates data structures or tables used by the operating system to reference the logical C: drive. In the present example, Waffle locates the Drive Data Table (DDT), the Drive Parameter Block (DPB), and the Current Directory Structure (CDS) used by DOS. Waffle also characterizes the above referenced structures according to operating system type (e.g., DOS 6.x, DOS 7.x) and file system type (e.g., FAT16 primary, FAT32 primary). It is understood that the operating system type and file system type represent characteristics of the particular operating system, in the present example DOS, and are well understood by those of ordinary skill in the art.

At step 132, Waffle modifies each of the above referenced structures by extracting specific data from the partition boot record stored in RAM 14a, and writing the data into the structures. Since DOS accesses the C: drive by referring to the above referenced data structures, any attempts to access the C: drive via DOS will now be directed to the utility partition 32. Execution then returns to step 114.

If at step 114 the received directive is "primary", then execution proceeds to step 140. Steps 140–152 are similar to 120–132, respectively. At step 140, Waffle checks the DOS reference tables to make sure that the logical C: drive currently maps to the utility partition 32. At step 142, if the logical C: drive does not map to the utility partition 32, then execution proceeds to step 124 where the error message is displayed. If, however, the logical C: drive does map to the utility partition 32, execution proceeds to step 145.

At step 145, Waffle flushes any buffers or cache. At step 146, Waffle loads into RAM 14a the partition boot record 50 for the primary partition 34. At step 148, Waffle swaps the type codes and activity flags for both partitions 32, 34. In the present example, the primary partition 34 will now have a type code equal to 06h and have an activity flag designated active, and the utility partition 32 will now have the type code equal to DEh and have an activity flag designated inactive. At step 150, Waffle locates data structures or tables used by the operating system to reference the logical C: drive. Finally, at step 152, Waffle modifies each of these data structures by extracting specific data from the partition boot record stored in RAM 14a and writing the data into the structures and execution returns to step 114.

Although illustrative embodiments have been shown and described, a latitude of modification, change and substitution is intended in the foregoing disclosure, and in certain instances, some features will be employed without a corresponding use of other features. Furthermore, additional features, such as error handling routines, may be added to the illustrative embodiment without altering the scope of the embodiment. Accordingly, it is appropriate that the appended claims be construed broadly.

What is claimed is:

1. A computer comprising:

at least one processor for running operating code;

at least one storage accessible by the processor, the storage being separated into at least two partitions;

the operating code for using a logical reference to the storage and including a table for mapping the logical reference to a first partition of the at least two partitions; and a routine for dynamically switching, in response to a directive provided by a manufacturing process, the logical reference to a second partition of the at least two partitions by altering the table;

wherein the first and second partitions each include a type code and wherein the routine swaps the type of each partition when it changes the logical reference, so that the partition to which the logical reference is made has a type that is visible to the operating code and the other partition has a type that is not visible to the operating code, wherein the first and second partitions each include a status code and wherein the routine also swaps the status of each partition when it changes the logical reference, so that the partition to which the logical reference is made has an active status and the other partition does not have an active status, and wherein after the routine alters the table, the processor may continue running the operating code without requiring the computer to reboot and when the operating code uses the logical reference to the storage, the operating code is mapped to the second partition.

2. The computer of claim 1, further comprising a second storage, wherein the routine is stored on the second storage.

3. The computer of claim 2, wherein the second storage is a floppy diskette.

4. The computer of claim 2, wherein the second storage is connected to the processor through a network interface.

5. The computer of claim 2, wherein the operating code is stored on the second storage.

6. The computer of claim 1, further comprising:

a cache; and means for flushing the cache after the routine has altered the table.

7. A method for allowing an operating system to access two different partitions of a single storage device by using a single logical reference, wherein each partition has its own boot record and the operating system includes a drive table, the method comprising the steps of:

(i) designating the first partition as active and setting a type of the first partition to a valid partition type and designating the second partition as inactive and setting the type of the second partition to an invalid partition type; and (ii) switching, in response to a directive by a manufacturing process, the logical reference from the first partition to the second partition by loading the boot record for the second partition;

(iii) inserting data from the loaded boot record into the drive table; and (iv) designating the second partition as active and setting a type of the second partition to a valid partition type and designating the first partition as inactive and setting the type of the first partition to an invalid partition type.

8. The method of claim 7, further comprising, before step (ii), restarting the operating system.

9. The method of claim 7, further comprising, before step (ii), checking that the second partition is not active.

10. A system for allowing operating code to access two different partitions of a storage device by using a single logical reference, wherein each partition has its own boot record and the operating code uses a drive table, the system comprising:

means for designating the first partition as active and setting a type of the first partition to a valid partition type and designating the second partition as inactive and setting the type of the second partition to an invalid partition type; and means for switching, in response to a directive by a manufacturing process, the logical reference from the first partition to the second partition by loading the boot record for the second partition, inserting data from the loaded boot record into the drive table, and designating the second partition as active and setting a type of the second partition to a valid partition type and designating the first partition as inactive and setting the type of the first partition to an invalid partition type.

11. The system of claim 10, further comprising means for restarting the operating code before the boot record is loaded.

12. The system of claim 10, further comprising means for checking that the second partition is not active before the boot record is loaded.

* * * * *